United States Patent [19]

Langdon, Jr. et al.

[11] 4,225,861
[45] Sep. 30, 1980

[54] METHOD AND MEANS FOR TEXTURE DISPLAY IN RASTER SCANNED COLOR GRAPHIC

[75] Inventors: Glen G. Langdon, Jr., San Jose; Patrick E. Mantey, Los Gatos, both of Calif.

[73] Assignee: International Business Machines Corporation, Armonk, N.Y.

[21] Appl. No.: 970,598

[22] Filed: Dec. 18, 1978

[51] Int. Cl.³ ............................................... G06F 3/153
[52] U.S. Cl. ................................... 340/703; 340/701; 340/744; 340/798; 358/903
[58] Field of Search .................. 340/701, 703; 358/37, 358/903

[56] References Cited

U.S. PATENT DOCUMENTS

| | | | |
|---|---|---|---|
| 3,729,580 | 4/1973 | Schneider | 358/30 |
| 3,843,959 | 10/1974 | Owaki et al. | 358/59 |
| 3,854,130 | 12/1974 | Ligocki | 340/703 |
| 3,961,365 | 6/1976 | Payne et al. | 358/56 |
| 3,976,982 | 8/1976 | Eiselen | 364/900 |
| 4,146,876 | 3/1979 | Arellano et al. | 340/785 |
| 4,149,164 | 4/1979 | Reins et al. | 340/701 |
| 4,149,184 | 4/1979 | Giddings et al. | 340/703 X |

OTHER PUBLICATIONS

Giddings & Langdon, "Interactive Color Selection Apparatus for Color Graphics Displays;" IBM Tech. Disc. Bul., vol. 19, No. 11, Apr. 1977, pp. 4400, 4401.

Primary Examiner—David L. Trafton
Attorney, Agent, or Firm—R. Bruce Brodie

[57] ABSTRACT

A method and means for creating the display illusion of "roughness" or "texture" in color patterns suitable for an raster scanned display surface by assigning different color values to pels (picture elements) in adjacent positions and then replicating the patterns automatically using the recurrent and sequential accessing of a concordance table. The real color of each pel of a textured pattern is a joint function of a color number stored in a refresh buffer driving the display surface for any given display matrix array pel position and the value of a predetermined subset of address bits which describe that pel position. The use of preselected pel position address bits for regulating texture is shown as applied to video lookup tables and refresh buffers as a single level control and additionally to two or more video lookup tables for achieving a pattern hierarchy.

6 Claims, 10 Drawing Figures

PRIOR ART  FIG.1

ADDRESS BITS PARTITION OUTPUT VLT AND DISPLAY SURFACE

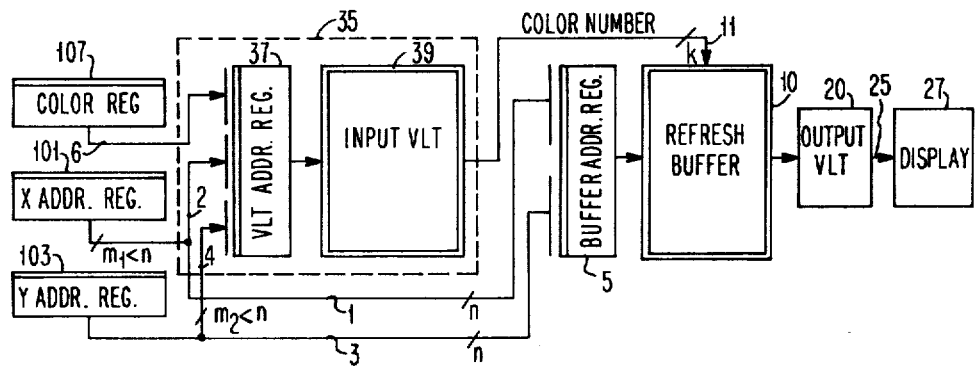
INPUT VLT TRANSFORM FOR COLOR NUMBER/TEXTURE INSERTION INTO REFRESH BUFFER
FIG. 3
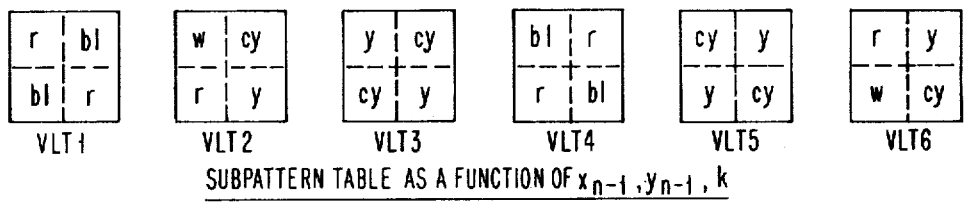
SUBPATTERN TABLE AS A FUNCTION OF $x_{n-1}, y_{n-1}, k$
FIG. 4a
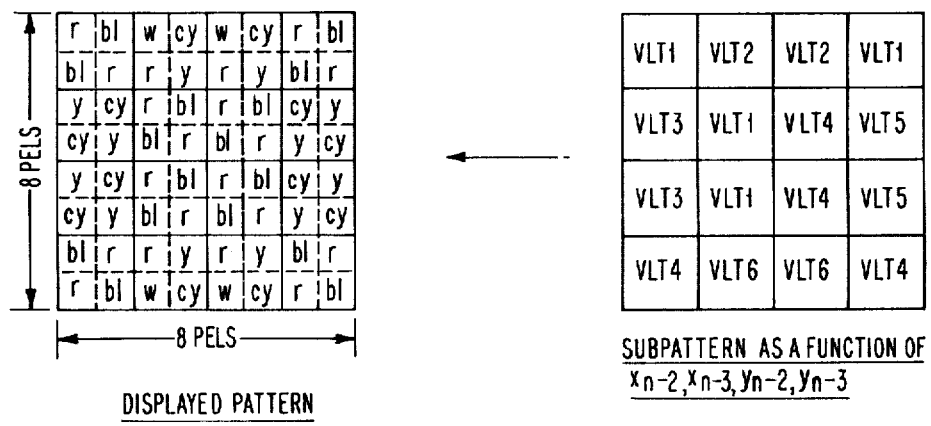
DISPLAYED PATTERN
FIG. 4b
SUBPATTERN AS A FUNCTION OF $x_{n-2}, x_{n-3}, y_{n-2}, y_{n-3}$
FIG. 4c

TEXTURE DISPLAY VIA TWO LEVEL VLT PATTERN HIERARCHY

EVENT-ACTIVITY DIAGRAM, TWO LEVEL VLT

METHOD AND MEANS FOR TEXTURE DISPLAY IN RASTER SCANNED COLOR GRAPHIC

DESCRIPTION

Technical Field

This invention relates to an electronic color graphics display system, and more particularly to methods and means for locally altering the display patterns exhibited by raster scanned color graphics systems for enhancing display pattern variety.

Prior Art

The prior art is replete with raster scanned color graphics systems emphasizing diverse electro optical color properties. Payne et al, U.S. Pat. No. 3,961,365 shows a map of segmented display areas and a table indicating a one out of n degrees of brightness associated with each segment. This provides a varying brightness control when a color display is imaged upon a large surface suitable for audience viewing. Owaki et al, U.S. Pat. No. 3,843,959 shows a system in which each discrete display area can exhibit adjacent pels of dissimilar luminosity. Schneider, U.S. Pat. No. 3,729,580 is directed to the analog control of color fringing and misregistration of color TV imaging.

Contemporary color graphics terminals select colors from an electronic TV equivalent of a multi color palette with a conversion algorithm permitting the use of hue, brightness, and a method for specifying color. In some systems up to eight colors may be displayed at once when selected from the palette.

Raster scanned color graphics system of the prior art store their images in a refresh buffer memory. It is common practice to store a "color number" in the refresh memory and to use a video lookup table (VLT) to bridge the gap between a small number of color number bits per pel stored for each position in the refresh buffer and the larger number of bits used for defining the red, green, and blue intensity for driving the counterpart color guns of the display device. In this regard, the color numbers available at any one time are usually much less than the number of different colors capable of being displayed. The "mapping" of the color number in the refresh buffer to the larger number of bits required for the real color value as viewed on the video screen is executed by a table lookup technique involving a VLT.

Raster scan color graphic systems display solid objects such as polygons or filled circles as contiguous pels of the same color value. In turn, the refresh buffer memory stores the same color number for all pels in the solid color area. This technique provides only for flat textureless colors. The illusion of roughness or texture results when not all the pels in an area have the same color value. However, software techniques to provide the illusion of color texture to a contiguous area would consume significant CPU resources.

The Invention

It is an object of this invention to devise a method and means of creating the display illusion of "roughness" or "texture" in color patterns for an raster scanned display surface. It is a related object to devise a method and means for generating visually exciting lines, characters, and colored areas under the auspices of a single color number assignment or selection by a user. It is yet another object to minimize the utilization of CPU resources ordinarily driving a raster color graphics system. It is a complementary object that the method and means so devised permit more real colors to be simultaneously displayed than there are color number combinations in said refresh buffer.

Satisfaction of the foregoing object is premised on the unexpected observation that the real color value for each pel may be made to serve as a joint function of the color number stored in the refresh buffer of the display for any given pel position and the value of any subset of the address bits which describe that pel position. In turn, this observation is embodied in a method and means for creating the illusion of roughness or texture in color patterns for an electrochromic display surface by positioning pels of different color values in adjacent positions and then replicating the patterns automatically. The texture effect is achieved when color values are combined with the lowest order address bits of the pel position. If, for example, the highest order x (horizontal) and y (vertical) pel address bits are used, then the viewing surface is divided into four guadrants, each having its own selection of real colors. More particularly, the method steps of the invention comprise (1) assigning a color number k for each pattern to be displayed; (2) creating a table associating the color value v for the $i=0, 1, \ldots, m-1; j=0, 1, \ldots, m-1$ pel position in the mxn pel array of the pattern having the address k, i, j; (3) displaying the color value v on the surface; and (4) accessing the table at the address k, i, j+1 in order to obtain the color value v' at the next successive display position i, j+1.

Advantageously, texture information may be combined with the color number in a variety of ways. In one apparatus embodiment of the invention, texture information is written into the refresh buffer itself. This may be implemented by incorporating address bit subset controlled "texture information" into the "color number" prior to insertion of the so modified color number into the refresh buffer memory. In an alternative apparatus embodiment of the invention, the color number from the refresh buffer together with a preselected subset of address bits defining the pel position and implied texture information when taken together, can be used to define an address in a lookup table for extracting the real color value. In yet another apparatus embodiment of the invention, means for selecting the transformations and for incorporating and utilizing complex texture information can be simplified if they are executable in a two level pattern hierarchy of subpattern and superpattern selection.

BRIEF DESCRIPTION OF THE DRAWING

FIG. 1 discloses color value using an output VLT with a refresh buffer as found in the prior art.

FIG. 2a defines the x and y address byte formats.

FIG. 3 depicts an input VLT for incorporating externally supplied texture information into the color number prior to insertion of the modified color number into the refresh buffer.

FIG. 4a, shows the subpattern tables whose selection is a function of the lowest order pel position address bits, extracted color number, and superpattern selection signal; FIG. 4b depicts a superpattern as a function of higher order pel position address bits; and FIG. 4c sets forth a typical 8 pel×8 pel displayed pattern.

DESCRIPTION OF THE BEST MODE AND INDUSTRIAL APPLICABILITY

Figure 1A:
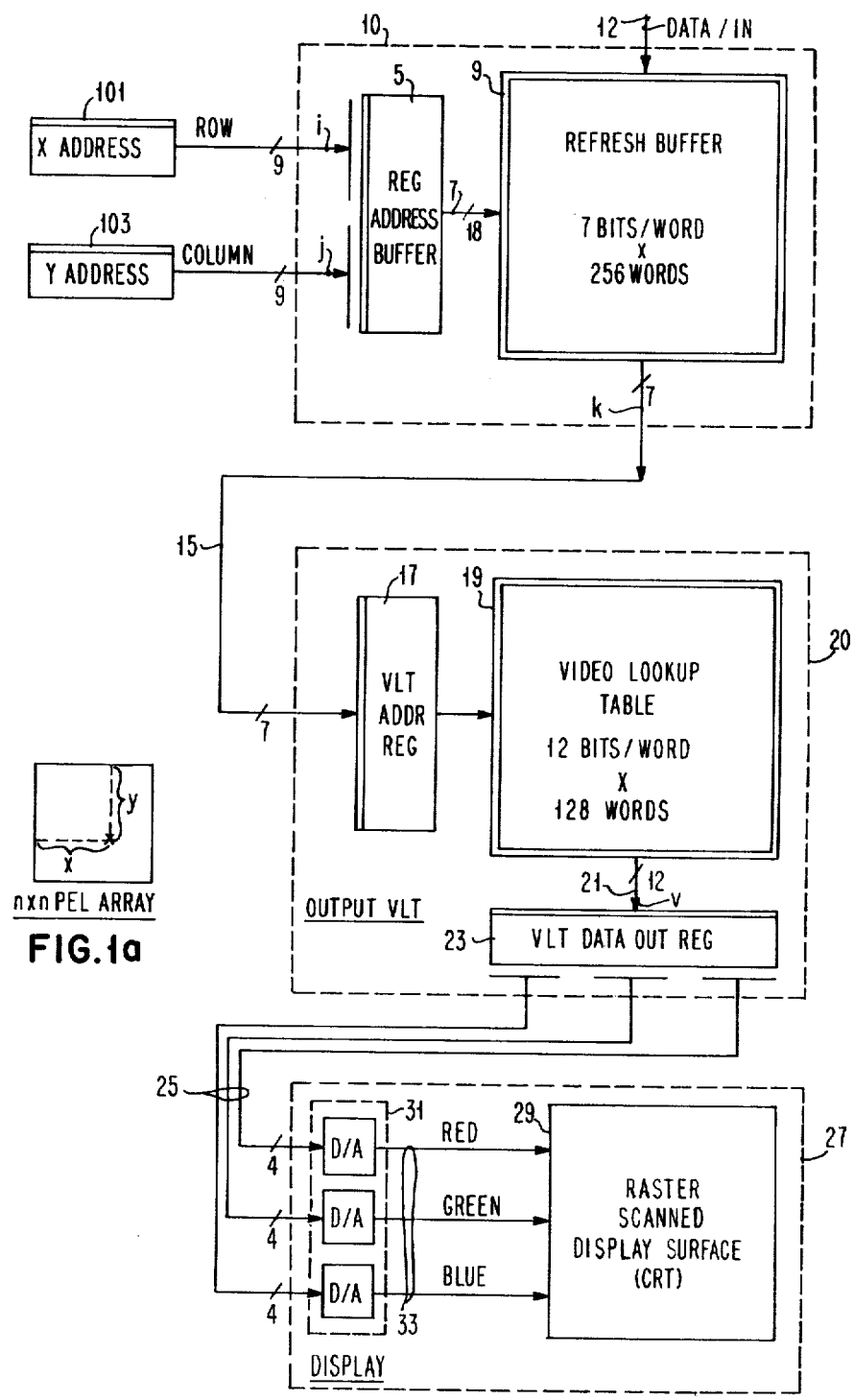
FIG. 1a depicts an x-y coordinate system for pel location in an array.

Referring now to FIG. 1 there is shown a raster scan color graphics display system typified by the prior art. Such systems include a buffer subsystem 10, operable in a read and write mode, for storing an image consisting of a matrix of color numbers for subsequent presentation on the raster scanned surface 29 of display subsystem 27. Interposed between the buffer and display subsystem is a video lookup table 20 for translating each color number 10, fetched from memory 9 at the matrix x, y position coordinates previously accessed by address register 5, into a counterpart color value v. Each color value v is converted by digital to analog means 31 as intensities for the appropriate red, green, and blue electron guns illuminating the raster scan surface 29. Parenthetically, the heavy border on refresh buffer memory 9, and the video lookup tables (VLT) memory 19 denote both writeable and readable stores. Also, the single heavy border on registers and counters is indicative of the fact that they are edge triggered. The change of state occurs on the leading edge of a signal clock.

Buffer subsystem 10 comprises refresh buffer memory 9 capable of storing an image matrix of $2^9 \times 2^9$ pel positions. Each of the resulting 262,144 image memory pel locations is capable of storing at least 7 bits, termed a "color number". Each buffer memory 9 location may be accessed by an 18 bit address furnished by address register 5 over path 7. When memory 9 is operated in the read mode the 7 bit color number k is read out over path 15 to the VLT address register 17. Throughout this description, a cross hatch on a path with an adjacent number indicates the number of parallel conductors per path. Thus path 7 has 18 conductors while path 15 contains 7 conductors.

A video lookup table is used to bridge the gap between the small number of color number bits per pel (7) stored for each position in the refresh buffer memory 9 and the larger number of bits used for driving the red, green, and blue color guns within the digital to analog converter 31 illuminating the display surface 29. The larger number of bits driving the color guns consist of an equal number of bits for each gun and define the number of intensities for each color. Thus, for each color value of 12 bits, 4 bits are set aside for each color intensity. The product of 16 levels of intensity for each of the 3 colors makes possible a total of 4096 unique real colors on the display surface.

Motivation for the use of plural memories and transformations arises from the very high cost of large fast refresh buffer memory arrays. This is reflected in the fact that the color numbers available at any one time are usually much less than the 4096 colors capable of being displayed. The "mapping" of the color number from the refresh buffer memory to the 12 bit real color value viewed on the display surface is carried out by the VLT. In the VLT memory 19 there is a 12 bit color value corresponding to each color number. Significantly, the color value is independent of the pel location. The same color number from the refresh buffer is always transformed into the same 12 bit color value driving the display surface. Thus, color number extracted from refresh memory 9 is transferred over path 15 to the VLT address register 17. The 12 bit color value corresponding to the color number is extracted from memory 19 over path 21 and placed in output register 23. At the occurrence of the next clock signal four 3 bit combinations are applied to the respective electron guns 31 over counterpart paths 25.

As previously mentioned, prior art systems generate solid color shapes which are flat or textureless. For colors without texture, the same 12 bit color value can be stored for the same color number in each memory. However, it is an attribute of this invention that to generate colors with texture, one 12 bit color can be stored in an odd scan line of the VLT and a different 12 bit color in the corresponding address of an even scan line of a VLT. When the "textured area" is to be displayed, the same 7 bit color number in the refresh buffer can deliver a different 12 bit color to the display surface depending on whether it is an odd line or an even line. Similarly, vertical textured patterns can be generated by detecting pel bit times which correspond to columns and, for the same color number, display one color for even bit times and another color for the odd bit times.

Figure 2:
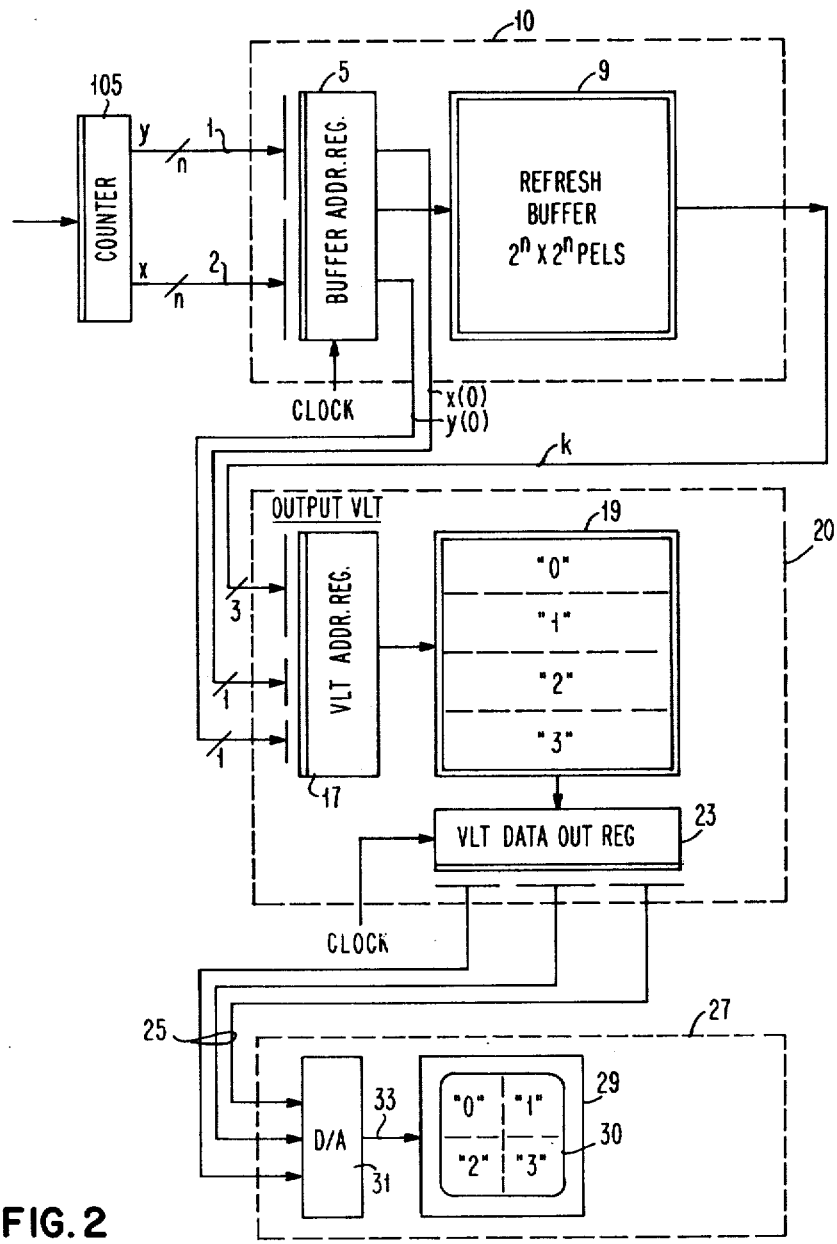
FIGS. 2 and 2a disclose the use of a color number and position information for selecting a color value from an output VLT according to the invention.
Figure 2A:
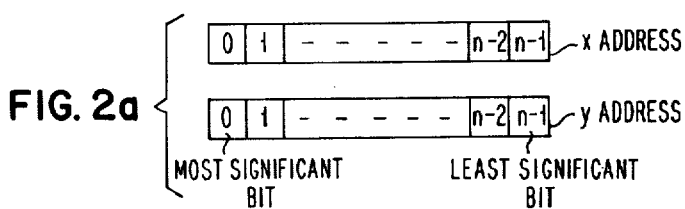

Referring now to FIG. 2a there is shown the byte format for the XY pel coordinates which serve also as address bytes for the refresh buffer memory 9. In this format, the leftmost or zero bit is the most significant while the rightmost or $n-1$ position denotes the least significant bit.

Referring now to FIG. 2, there is shown an embodiment of the invention in which the color value in VLT memory 19 is selected as a function of the color number from refresh memory 9 and the high order location bits $x_0$, $y_0$. All raster scan color graphics display systems are synchronous, i.e., clock driven. To this extent an external clock drives counter 105. The counter output supplies the necessary change of consecutive address position to the edge triggered address register 5. From the output of register 5, the high order bits $x_0$ and $y_0$ are applied also to the input of VLT address register 17. It should be observed that counter 105 address registers 5, 17, and output register 23 are all clocked. The activities occurring during consecutive clock periods are set out in FIG. 6. The menu of events shown in FIG. 6 applies to the embodiment shown in FIGS. 2, 3 and 5.

Referring again to FIG. 2, VLT memory 19 is shown partitioned into arbitrary areas "0", "1", "2", "3". These areas correspond to predetermined portions 30 of display surface 29. It is clear, that the two high order bits $x_0$, $y_0$ can be used to designate the counterpart areas. The complete address is of course determined by the high order address bits together with color number k from output register 13 of refresh buffer memory 9.

Figure 6:
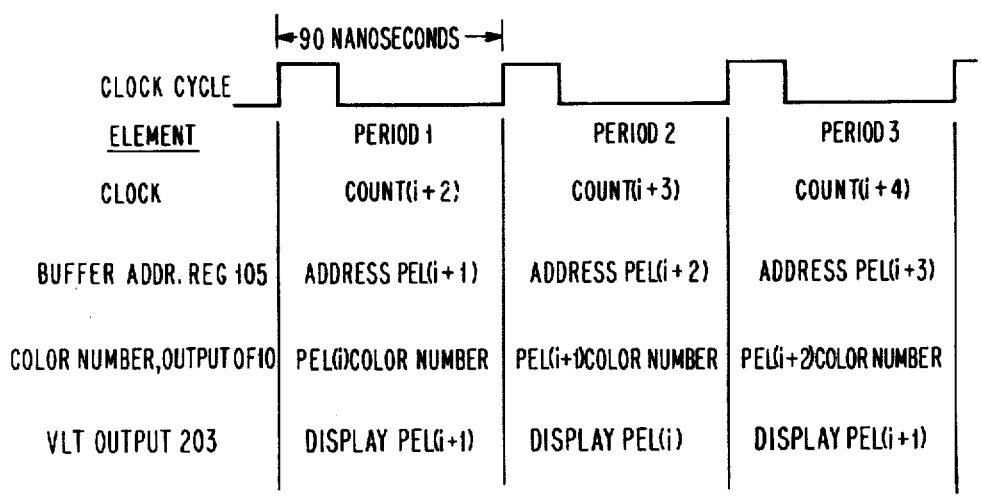
FIG. 6 is an event activity diagram of selected display system elements as a function of time.

Referring to FIG. 6 when taken together with FIG. 2, it is clear that during a first clock period after counter 105 is incremented to count pel position $i+2$ buffer address register 5 is actually accessing the pel at location $i+1$ from buffer memory 9. Thus, the color number k to be loaded into address register 17 at the end of the period represents the color number for the pel at location $i+1$. Simultaneously, VLT address register 17 is accessing the real color value v of pel i from memory 19, to be clocked into register 23 at the end of the period. The last concurrent operation is that the color value v being applied to display subsystem 27 in output register 23 is associated with the pel color number at location i-3. In the next period the count is incremented by one over the previous period. In a system embodying the invention using edge triggered registers and counters changing state with the leading edge of the signal clock, a display surface of 512 pels per line requires a bit time in the order of 90 nanoseconds. The x value counts the column along the row and the y value denotes the row. For raster scan, x is incremented until the end of the row, when it returns to the first column, the row or y value is incremented. Thus, the n lowest order bits of counter 105 comprise the x pel address and the highest order n bits of counter 105 comprise the y address. Each pel position may be denoted by a single letter i, with it being understood to comprise both x and y.

The raster scanned color graphics display system operates as suggested above in a pipeline of four stages. The functions are distributed such that (1) counter 105 counts up to the next pel address, (2) address register 5 holds the address for the refresh buffer memory 9, (3) address register 17 holds the color number as an address for the VLT memory 19, and (4) VLT output register 23 holds the color values for the digital to analog conversion necessary for pel color display. Also, each stage should have no more than one pel time (e.g. 90 nanoseconds) of delay. For instance, the buffer memory access time plus the propagation delay of the address register 5 plus the setup time for color value register 23 should be less than 90 nanoseconds.

Referring now to FIG. 3, there is shown an alternative method and means for inserting texture information. The modification includes information inserting (writing) into the refresh buffer memory 9. This is implemented by the preloading of a color register 107 until the value of the color registers change. All vectors and characters placed in the refresh buffer memory take on that color number resident in the color register. Instead of simply loading the color number from the color register into the refresh buffer unaltered, this embodiment permits a "texture" pattern to be incorporated into the refresh buffer memory itself. Note that the color number is a function of the contents of a color register and predetermined subset of address position bits applied through VLT address register 37 to VLT memory 39.

Referring now to FIG. 4c there is shown a display pattern of 8×8 pels which can be decomposed into a 4 cell×4 cell "superpattern", where each cell is a 2 pel×2 pel "subpattern". Instead of having to formulate a color number in respect of 64 pels for the display pattern shown in FIG. 4c, a two stage selection procedure is invoked. In the example, the first stage involves superpattern selection of 1 of 6 subpatterns for each of the 16 "super" cells.

Referring now to FIG. 4a the subpattern tables are selected as a function of the address bits $x_{n-1}$, $y_{n-1}$ and color number k. Six 4 pel subpatterns are shown. These are designated respectively VLT 1, VLT 2, ... VLT 6. In these tables "r" is red, "bl" is blue, "w" is white, "cy" is cyan, "y" is yellow. The patterns and the colors are meant to be illustrative and not exhaustive.

Figure 5:
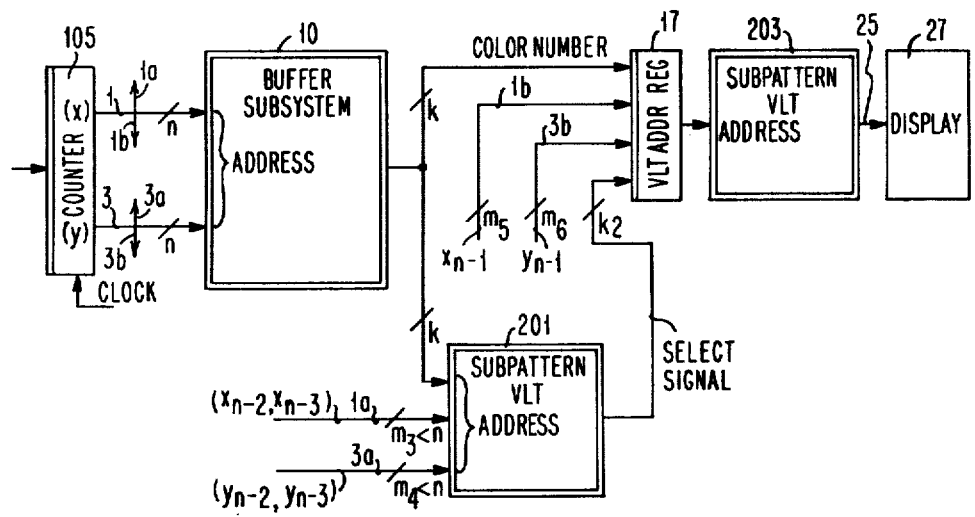
FIG. 5 shows an embodiment of texture display via a two level VLT pattern hierarchy.

Referring now to FIG. 5, there is depicted the means for texture display via two level VLT selection pattern hierarchy employing superpattern and subpattern selection as described in connection with FIGS. 4a, b, c. First, the color number k is selected as a function of the x, y pel address applied to buffer subsystem 10. The super patterns are chosen from an address formed from the color number k and the address bits $x_{n-2}$, $x_{n-3}$, $y_{n-2}$, $y_{n-3}$. In turn, the sub patterns are selected according to an addressed formed from the color number k, the low order address bits $x_{n-1}$, $y_{n-1}$, and a select signal representing the superpattern or cell. These are applied to the display subsystem 27 over path 25 as a series of color values.

The texture capability can also be used to achieve the effect of a finer gradation in color. For example, consider a shade of red between the intensity levels 12 and 13. A shading illusion can be achieved by alternating red intensity 12 with intensity 13. The same technique can be employed in performing shading, where an area is to become progressively darker in one direction. Often, when changing from one intensity to the next lower level, there is a noticeable line. This line can be smoothed over by specifying a textured color to the boundary area.

While there has been shown and described three embodiments in accordance with the present invention, it is understood that the same is not limited thereto but is susceptible of numerous changes and modifications as are known to those skilled in the art. Therefore the invention should not be limited to the details shown and described herein but are intended to cover all such changes and modifications as are encompassed by the scope of the appended claims.

We claim:

1. A method for creating the display illusion of roughness or texture in color patterns for a raster scanned display surface by positioning pels of different color values in adjacent positions and then replicating the patterns automatically, the method steps comprise:

assigning a color number k for each pattern to be displayed;

creating a table in a memory associating a color value v for the relative pel position h, j in the m×n pel array of the pattern having the address k, i, j, where $0 \leq i \leq m-1$, and $0 \leq j \leq n-1$; and reiteratively displaying the color value v on the surface and accessing the table in the memory at the address k, i, j+1 in order to obtain the color value v′ at the next successive display position i, j+1.

2. A raster scanned color graphics system comprising:

an raster scanned display means (27);

first addressible memory means (10) for storing a display image pel array of color numbers in memory locations corresponding to pel array positions;

means (105, 101, 103, 5) for accessing the first memory for fetching color numbers from consecutive locations in raster scan order;

means for deriving a color value v as a joint function of the color number k stored in any given location and the value of any subset of addressing bits from the accessing means defining the pel position; and means (23, 25) for applying the color value to the display means.

3. A raster scanned color graphics system according to claim 2, wherein the means for deriving a color value v include a second addressible memory means (20) for storing color values at locations whose addresses are defined by the color number k and a subset of the address bits from the accessing means defining the pel position.

4. A raster scanned color graphics system including an raster scanned display means (27); a refresh buffer memory means (10) for storing a display image pel array of color numbers k at counterpart addressible locations; and means (101, 103, 105) for accessing the color numbers from the refresh memory in raster scan order; wherein the improvement comprises:

first means (201) for deriving a selection signal ($k_2$) indicative of a superpattern as a joint function of the color number k accessed from the refresh buffer and a first predetermined subset of address bits ($x_{n-2}$, $x_{n-3}$, $y_{n-2}$, $y_{n-3}$) from the accessing means defining the pel array position of k;

second means (203) for deriving a color value v indicative of a selected subpattern as a joint function of the color number k from the first means, a second predetermined subset of address bits ($x_{n-1}$, $y_{n-1}$) from the accessing means defining the pel array position of k, and the selection signal ($k_2$); and means for applying the color value to the display means.

5. A raster scanned color graphics system according to claim 4, wherein the first and second means respectively include a first and second addressible storage means.

6. A raster scanned color graphics system including an raster scanned display means (27); a refresh buffer memory means (10) for storing a display image pel array of color numbers k at counterpart addressible locations; means (1,3,5) for accessing the color numbers k from the refresh memory in raster scanned order at an array address defined by the contents of a first register means (101,103); and means (20, 25) for deriving a color value v from a corresponding color number k accessed from the refresh buffer and applying said color value v to the display means; wherein the improvement comprises:

a second register means (107) for storing texture information;

the accessing means includes means (35) for deriving a color number k as a joint function of the first register contents and a predetermined subset of address bits and for inserting said derived color number at a refresh buffer memory location defined by the first register means contents.

* * * * *